US012137323B2

(12) United States Patent
Pedersen et al.

(10) Patent No.: US 12,137,323 B2
(45) Date of Patent: Nov. 5, 2024

(54) HEARING AID DETERMINING TALKERS OF INTEREST

(71) Applicant: Oticon A/S, Smørum (DK)

(72) Inventors: Michael Syskind Pedersen, Smørum (DK); Jesper Jensen, Smørum (DK); Jan M. De Haan, Smørum (DK); Poul Hoang, Smørum (DK)

(73) Assignee: Oticon A/S, Smørum (DK)

( * ) Notice: Subject to any disclaimer, the term of this patent is extended or adjusted under 35 U.S.C. 154(b) by 85 days.

(21) Appl. No.: 17/691,898

(22) Filed: Mar. 10, 2022

(65) Prior Publication Data

US 2022/0295191 A1 Sep. 15, 2022

(30) Foreign Application Priority Data

Mar. 11, 2021 (EP) .................................... 21161933
Aug. 31, 2021 (EP) .................................... 21193936

(51) Int. Cl.
*H04R 25/00* (2006.01)
*G10L 21/0216* (2013.01)

(52) U.S. Cl.
CPC ........ *H04R 25/505* (2013.01); *G10L 21/0216* (2013.01); *H04R 25/453* (2013.01); *G10L 2021/02166* (2013.01)

(58) Field of Classification Search
None
See application file for complete search history.

(56) References Cited

U.S. PATENT DOCUMENTS 4,630,305 A * 12/1986 Borth .................. G10L 21/0208
704/226
2012/0128186 A1 5/2012 Endo et al.
(Continued)

FOREIGN PATENT DOCUMENTS

EP 3 793 210 A1 3/2021

OTHER PUBLICATIONS

Shammur A. Chowdhury et al., Predicting User Satisfaction from Turn-Taking in Spoken Conversations, 2016 Interspeech 2910 (Sep. 12, 2016) (Year: 2016).*
(Continued)

*Primary Examiner* — Walter F Briney, III
(74) *Attorney, Agent, or Firm* — Birch, Stewart, Kolasch & Birch, LLP

(57) ABSTRACT

A hearing aid includes an input providing an input signal representing sound in an environment, the input signal including no speech signal, or one or more speech signals from one or more speech sound sources and additional signal components, termed noise signal, from one or more other sound sources, an own voice detector, a voice activity detector, and a talker extraction unit to determine and/or receive one or more speech signals as separated one or more speech signals from speech sound sources other than the hearing aid user and to detect the speech signal originating from the voice of the user. The talker extraction unit provides separate signals, each including, or indicating presence of, one of the one or more speech signals. A noise reduction system determines speech overlap and/or gap between the speech signal originating from the user's voice and each of the separated one or more speech signals.

20 Claims, 4 Drawing Sheets

(56) References Cited

U.S. PATENT DOCUMENTS

| | | | | |
|---|---|---|---|---|
| 2013/0144622 | A1 | 6/2013 | Yamada et al. | |
| 2021/0266682 | A1* | 8/2021 | Fischer | G06F 3/167 |

OTHER PUBLICATIONS

Extended European Search Report issued in 21161933.3 dated Aug. 11, 2021.

Extended European Search Report issued in 21193936.8 dated Feb. 17, 2022.

* cited by examiner

HEARING AID DETERMINING TALKERS OF INTEREST

SUMMARY

The present application relates to a hearing aid adapted for being located at or in an ear of a hearing aid user, or for being fully or partially implanted in the head of a hearing aid user.

The present application further relates to a binaural hearing system comprising a hearing aid and a contralateral hearing aid.

The present application further relates to a method of operating a hearing aid adapted for being located at or in an ear of a hearing aid user, or for being fully or partially implanted in the head of a hearing aid user.

A Hearing Aid:

In a multi-talker babble scenario, several talkers may be seen as sounds of interest for a hearing aid user. Often multiple conversations occur at the same time.

Especially, hearing impaired listeners cannot cope with all simultaneous talkers.

Thus, there is a need to determine the talkers of interest to the hearing aid user and/or the directions to the talkers. Also, there is a need to determine the talkers, which should be considered as unwanted noise or at least categorized with a lower degree of interest to the hearing aid user.

In an aspect of the present application, a hearing aid adapted for being located at or in an ear of a hearing aid user, or for being fully or partially implanted in the head of a hearing aid user, is provided.

The hearing aid may comprise an input unit for providing at least one electric input signal representing sound in an environment of the hearing aid user.

Said electric input signal may comprise no speech signal.

Said electric input signal may comprise one or more speech signals from one or more speech sound sources.

Said electric input signal may additionally comprise signal components, termed noise signal, from one or more other sound sources.

The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise an output unit for providing a stimulus perceived by the hearing aid user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the hearing aid user (e.g. in an acoustic (air conduction based) hearing aid). The output transducer may comprise a vibrator for providing the stimulus as mechanical vibration of a skull bone to the hearing aid user (e.g. in a bone-attached or bone-anchored hearing aid).

The hearing aid may comprise an own voice detector (OVD) for repeatedly estimating whether or not, or with what probability, said at least one electric input signal, or a signal derived therefrom, comprises the speech signal originating from the voice of the hearing aid user, and providing an own voice control signal indicative thereof.

For example, an own voice control signal may comprise a binary mode providing 0 ("voice absent") or 1 ("voice present") depending on whether or not own voice (OV) is present.

For example, an own voice control signal may comprise providing with what probability OV is present, p(OV) (e.g. between 0 and 1).

The OVD may estimate whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The hearing aid may comprise a voice activity detector (VAD) for repeatedly estimating whether or not, or with what probability, said at least one electric input signal, or a signal derived therefrom, comprises the no speech signal, or the one or more speech signals from speech sound sources other than the hearing aid user and providing a voice activity control signal indicative thereof.

For example, a voice activity control signal may comprise a binary mode providing 0 ("voice absent") or 1 ("voice present") depending on whether or not voice is present.

For example, a voice activity control signal may comprise providing with what probability voice is present, p(Voice) (e.g. between 0 and 1).

The VAD may estimate whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise a voice detector (VD) for repeatedly estimating whether or not, or with what probability, said at least one electric input signal, or a signal derived therefrom, comprises no speech signal, or one or more speech signals from speech sound sources including the hearing aid user.

The VD may be configured to estimate the speech signal originating from the voice of the hearing aid user.

For example, the VD may comprise an OVD for estimating the speech signal originating from the voice of the hearing aid user.

The VD may be configured to estimate the no speech signal, or the one or more speech signals from speech sound sources other than the hearing aid user.

For example, the VD may comprise a VAD for estimating the no speech signal, or the one or more speech signals from speech sound sources other than the hearing aid user.

The hearing aid (or VD of the hearing aid) may be configured to provide a voice, own voice, and/or voice activity control signal indicative thereof.

The hearing aid may comprise a talker extraction unit.

The talker extraction unit may be configured to determine and/or receive the one or more speech signals as separated one or more speech signals from speech sound sources other than the hearing aid user.

Determine and/or receive may refer to the hearing aid (e.g. the talker extraction unit) being configured to receive the one or more speech signals from one or more separate devices (e.g. wearable devices, such as hearing aids, earphones, etc.) attached to one or more possible speaking partners.

For example, the one or more devices may each comprise a microphone, an OVD and a transmitter (e.g. wireless).

Determine and/or receive may refer to the hearing aid (e.g. the talker extraction unit) being configured to separate the one or more speech signals estimated by the VAD.

The talker extraction unit may be configured to separate the one or more speech signals estimated by the VAD.

The talker extraction unit may be configured to separate the one or more speech signals estimated by the VD.

The talker extraction unit may be configured to detect (e.g. detect and retrieve) the speech signal originating from the voice of the hearing aid user.

The talker extraction unit may be configured to provide separate signals, each comprising, or indicating the presence of, one of said one or more speech signals.

For example, indicating the presence of speech signals may comprise providing 0 or 1 depending on whether or not voice is present, or providing with what probability voice is present, p(Voice).

Thereby, the talker extraction unit may be configured to provide an estimate of the speech signal of talkers in the user's environment.

For example, the talker extraction unit may be configured to separate the one or more speech signals based on blind source separation techniques. The blind source separation techniques may be based on the use of e.g. a deep neural network (DNN), a time-domain audio separation network (TasNET), etc.

For example, the talker extraction unit may be configured to separate the one or more speech signals based on several beamformers of the hearing aid pointing towards different directions away from the hearing aid user. Thereby, the several beamformers may cover a space around the hearing aid user, such as dividing said space into acoustic pie pieces.

For example, each talker may be equipped with a microphone (e.g. a clip-on microphone), e.g. as may be the case in a network of hearing aid users. Alternatively, or additionally, each microphone may be part of a respective auxiliary device. The auxiliary device or hearing aid of the respective talkers may comprise a voice activity detection unit (e.g. a VD, VAD, and/or OVD) for picking up the own voice of the respective talker. The voice activity may be transmitted to the hearing aid of the user. Thereby, the talker extraction unit of the hearing aid may be configured to separate the one or more speech signals based on the speech signals detected by each of said microphones attached to the talkers. Hereby, high signal-to-noise (SNR) estimates of each talker are available and reliable voice activity estimates become available.

For example, one or more microphones (e.g. of an auxiliary device) may be placed in the space surrounding the hearing aid user. The one or more microphones may be part of one or more microphones placed on e.g. tables (e.g. conference microphones), walls, ceiling, pylon, etc. The one or more microphones (or auxiliary devices) may comprise a voice activity detection unit (e.g. a VD, VAD, and/or OVD) for picking up the voice of respective talker. Thereby, the talker extraction unit of the hearing aid may be configured to separate the one or more speech signals based on the speech signals detected by said microphones.

It is contemplated that two or more of the above exemplified techniques for separating the one or more speech signals may be combined to optimize said separation, e.g. combining the use of microphones placed on tables and the use of several beamformers for dividing the space around the hearing aid user into acoustic pie pieces.

The hearing aid may comprise a noise reduction system.

The noise reduction system may be configured to determine a speech overlap and/or gap between said speech signal originating from the voice of the hearing aid user and each of said separated one or more speech signals.

The hearing aid may be configured to determine the speech overlap over a certain time interval.

For example, the time interval may be 1 s, 2 s, 5 s, 10 s, 20 s, or 30 s.

For example, the time interval may be less than 30 s.

A sliding window of a certain width (e.g. the above time interval) may be applied to continuously determine the speech overlap/gap for the currently present separate signals (each representing a talker).

The time intervals may be specified in terms of an Infinite Impulse Response (IIR) smoothing specified by a time constant (e.g. a weighting given by an exponential decay).

Said noise reduction system may be configured to attenuate said noise signal in the at least one electric input signal at least partially.

The VAD may be configured to determine what is speech signal to be further analyzed and what is non-speech such as radio/TV and thus may overlap with the OV without necessarily having to be attenuated.

Accordingly, in order to decide which talkers, or which one or more speech signals, are of interest and which talkers are unwanted, we may use the social assumption that different talkers within the same conversation group rarely overlap in speech in time, as people either speak or listen and only a single person within a conversation is active.

Based on this assumption it is possible solely from the electric input signal (e.g. the microphone signals) to determine which talkers are of potential interest to the hearing aid user, and which are not.

The noise reduction system may be configured to determine the speech overlap and/or gap based at least on estimating whether or not, or with what probability, said at least one electric input signal, or signal derived therefrom, comprises speech signal originating from the voice of the hearing aid user and/or speech signals from each of said separated one or more speech signals.

The noise reduction system may be further configured to determine said speech overlap and/or gap based on an XOR-gate estimator.

The XOR-gate estimator may be configured to estimate the speech overlap and/or gap between said speech signal originating from the own voice of the hearing aid user and each of said separated one or more speech signals.

In other words, the XOR-gate estimator may be configured to estimate the speech overlap and/or gap between said speech signal originating from the own voice of the hearing aid user and each of said other separated one or more speech signals (excluding the speech signal originating from the own voice of the hearing aid user).

The XOR-gate estimator may e.g. be configured to compare the own voice control signal with each of the separate signals of the talker extraction unit to thereby provide an overlap control signal for each of said separate signals. Each separate signal of the talker extraction unit may comprise the speech signal of a given talker and/or a voice activity control signal indicative of whether or not (e.g. binary input and output), or with what probability (e.g. non-binary input and output), speech of that talker is present at a given time. The overlap control signal for a given speech signal identifies time segments where a given one of the one or more speech signals has no overlap with the voice of the hearing aid user.

Thereby, the speech signal of the talkers around the hearing aid user at a given time may be ranked according to a minimum speech overlap with the own voice speech signal of the hearing aid user (and/or the talker speaking with the smallest speech overlap with the own voice speech signal of the hearing aid user can be identified).

Thereby, an indication of a probability of a conversation being conducted between the hearing aid user and one or more of the talkers around the hearing aid user can be provided. Further, by individually comparing each of the separate signals of the talker extraction unit with all the other separate signals and ranking the separate signals according to the smallest overlap with the own voice speech signal, different conversation groups may be identified.

The noise reduction system may be further configured to determine said speech overlap and/or gap based on a maximum mean-square-error (MSE) estimator.

A maximum mean-square-error estimator may be configured to estimate the speech overlap and/or gap between said speech signal originating from the own voice of the hearing aid user and each of said separated one or more speech signals.

In other words, the maximum mean-square-error estimator may be configured to estimate the speech overlap and/or gap between said speech signal originating from the own voice of the hearing aid user and each of said other separated one or more speech signals, excluding the speech signal originating from the own voice of the hearing aid user.

Thereby, an indication of a minimum overlap and/or gap is provided (e.g. taking on values between 0 and 1, allowing a ranking to be provided). An advantage of the MSE measure is that it provides an indication of the nature of a given (possible) conversation between two talkers, e.g. the hearing aid user and one of the (other) talkers.

A value of the MSE-measure of 1 indicates a 'perfect' turn taking in that the hearing aid user and one of the talkers speak alternatingly (without) pauses between them (over the time period considered). A value of the MSE-measure of 0 indicates that the two talkers have the same pattern of speaking and/or being silent (i.e. speaking or being silent at the same time, and hence with high probability not being engaged in a conversation with each other). The maximum mean-square-error estimator may e.g. use as inputs a) the own voice control signal (e.g. binary input and output, or non-binary input and output, such as speech presence probability or OVL) and b) a corresponding voice activity control signal (e.g. binary input and output, or non-binary input and output, such as speech presence probability or VAD) for a selected one of the one or more speech signals (other than the hearing aid user's own voice). By successively (or in parallel) comparing the hearing aid user's own voice activity with the voice activity of each of (currently present) other talkers, a ranking of the probabilities that the hearing aid user is engaged in a conversation with one or more of the talkers around the hearing aid user can be provided. Further probabilities that the talkers (other than the hearing aid user) are in a conversation with each other can be estimated. In other words, different conversation groups can be identified in a current environment around the hearing aid user.

The noise reduction system may be further configured to determine said speech overlap and/or gap based on a NAND (NOT-AND)-gate estimator.

A NAND-gate estimator may be configured to produce an output which is false ('0') only if all its inputs are true ('1'). The input and output for the NAND-gate estimator may be binary ('0', '1') or non-binary (e.g. speech presence probability).

The NAND-gate estimator may be configured to compare the own voice (own voice control signal) of the hearing aid user with each of the separate speaking partner signals (speaking partner control signals).

The NAND-gate estimator may be configured to indicate that speech overlaps are the main cue for disqualifying talkers.

For example, in a normal conversation there may be long pauses, where nobody is saying anything. For this reason, it may be assumed that speech overlaps disqualify more than gaps between two speech signals. In other words, in a normal conversation between two persons, there is a larger probability of gaps (also larger gaps) than speech overlaps, e.g. in order to hear out the other person before responding.

The hearing aid may further comprise a timer configured to determine one or more time segments of said speech overlap between the speech signal originating from the own voice of the hearing aid user and each of said separated one or more speech signals.

Thereby, it is possible to track and compare each of the speech overlaps to determine which speech signals are of most and least interest to the hearing aid user.

For example, the timer may be associated with the OVD and the VAD (or VD). In such case, the timer may be initiated when both a speech signal from the hearing aid user and a further speech signal is detected. The timer may be ended when either the speech signal from the hearing aid user or the further speech signal is not detected any more.

For example, one way to qualify a talker (or a talker direction) as a talker of interest to the hearing aid user or as part of the background noise is to consider the time frames, where the hearing aid user's own voice is active. If the other talker is active, while the hearing aid user's own voice is active, said other talker is likely not to be part of the same conversation (as this unwanted talker is speaking simultaneously with the hearing aid user). On the other hand, if another talker speaks only when the hearing aid user is not speaking, it is likely that the talker and hearing aid user are part of the same conversation (and, hence, that this talker is of interest to the hearing aid user). Exceptions obviously exist, e.g. radio or television sounds are not part of normal social interaction, and thus may overlap with the hearing aid user's own voice.

An amount of speech overlap between the own voice of hearing aid user and the speech signals of one or more other talkers may be accepted, as small speech overlaps often exist in a conversation between two or more speaking partners. Such small speech overlap may e.g. be considered as a grace period.

For example, acceptable time segments of speech overlap may be 50 ms, 100 ms, or 200 ms.

The hearing aid may be configured to rank said separated one or more speech signals depending on the time segments of each of the speech overlaps between the speech signal originating from the own voice of the hearing aid user and each of said separated one or more speech signals.

The speech signal may be ranked with an increasing degree of interest as a function of a decreasing time segment of speech overlap.

The noise reduction system (and/or a beamforming system) may be configured to present the speech signals to the hearing aid user as a function of the ranking, via the output unit.

The noise reduction system (and/or a beamforming system) may be configured to provide a linear combination of all the ranked speech signals, where the coefficients in said linear combination may be related to said ranking.

For example, the highest ranked speech signal may be provided with a coefficient of higher weight than the lowest ranked speech signal.

The duration of a conversations between the hearing aid user and each (more) of other speaking partners may be logged in the hearing aid (e.g. in a memory of the hearing aid).

The duration of said conversations may be measured by the timer (a counter), e.g. to measure the amount of time where own voice is detected and the amount of time where the voice(s) (of interest) of one or more of the speaking partners are detected.

The hearing aid may be configured to determine whether said one or more of the time segments exceeds a time limit.

If said one or more of the time segments exceeds the time limit, then the hearing aid may be configured to label the respective speech signal as being part of the noise signal.

If said one or more of the time segments exceeds the time limit, then the hearing aid may be configured to rank the respective speech signal with a lower degree of interest to the hearing aid user compared to speech signals that do not exceed said time limit.

For example, the time limit may be at least ½ second, at least 1 second, at least 2 seconds.

The respective speech signal may be speech from a competing speaker, and may as such be considered to be noise signal. Accordingly, the respective speech signal may be labelled as being part of the noise signal so that the respective speech signal may be attenuated.

The one or more speech signals may be grouped into one or more conversation groups depending at least on the amount of speech overlap between the speech signal of the hearing aid user estimated by the OVD and the one or more speech signals estimated by the VAD.

The one or more conversation groups may be categorized with a varying degree of interest to the hearing aid user.

The categorization may at least partly be based on determined time segments of overlap, e.g. the larger the time segment of overlap, the lower the degree of interest to the hearing aid user.

The one or more conversation groups may be defined by comparing the speech overlaps between each of the one or more speech signals and all of the other one or more speech signals, including the speech signal from the hearing aid user.

For example, a situation may be considered where the hearing aid user is located in a room with three other talkers. The speech signal of the hearing aid user may overlap significantly (e.g. >1 s) with talker 1 and 2, but does not overlap or only minimally (e.g. <200 ms) with talker 3. Further, the speech signals of talkers 1 and 2 may overlap only minimally (e.g. <200 ms) or not at all. Thereby, it may be estimated that the hearing aid user is having a conversation with talker 3, and that talkers 1 and 2 are having a conversation. Thus, the hearing aid user and talker 3 are in one conversation group and talkers 1 and 2 are in another conversation group.

The noise reduction system may be configured to group the one or more separated speech signals into said one or more conversation groups depending at least on the determined direction.

The noise reduction system may be configured to group the one or more separated speech signals into said one or more conversation groups depending at least on the determined location.

The noise reduction system may be further configured to categorize sound signals impinging from a specific direction to be of a higher degree of interest to the hearing aid user than diffuse noise.

For example, the noise reduction system may be configured to group sound signals impinging from a specific direction in a conversation group with a higher degree of interest to the hearing aid user, than the conversation group in which diffuse noise, e.g. competing conversations, are grouped.

The noise reduction system may be further configured to categorize sound signals from a front direction of the hearing aid user to be of a higher degree of interest to the hearing aid user than sound signals from the back of the hearing aid user.

For example, the noise reduction system may be configured to group sound signals from a front direction of the hearing aid user in a conversation group with a higher degree of interest to the hearing aid user, than the conversation group in which sound signals from the back of the hearing aid user are grouped.

The noise reduction system may be further configured to categorize sound signals from sound sources nearby the hearing aid user to be of a higher degree of interest to the hearing aid user than sound signals from sound sources further away from the hearing aid user.

For example, the noise reduction system may be configured to group sound signals from sound sources near by the hearing aid user in a conversation group with a higher degree of interest to the hearing aid user, than the conversation group in which sound signals from sound sources further away of the hearing aid user are grouped.

The hearing aid (e.g. the noise reduction system of the hearing aid) may be configured to determine vocal effort of the hearing aid user.

The noise reduction system may be configured to determine whether the one or more sound sources are located nearby the hearing aid user and/or located further away from the hearing aid user, based on the determined vocal effort of the hearing aid user.

The hearing aid may comprise one or more beamformers.

The input unit may be configured to provide at least two electric input signals connected to the one or more beamformers.

The one or more beamformers may be configured to provide at least one beamformed signal.

The one or more beamformers may comprise one or more own voice cancelling beamformers.

The one or more own voice cancelling beamformers may be configured to attenuate the speech signal originating from the own voice of the hearing aid user as determined by the OVD.

Signal components from all other directions may be left unchanged or attenuated less.

For example, the remaining at least one electric input signal may then contain disturbing sounds (or more precisely disturbing speech signals+additional noise+e.g. radio/tv signals).

The hearing aid, e.g. the noise reduction system of the hearing aid, may be configured to update noise-only cross-power-spectral density matrices used in the one or more beamformers of the hearing aid, based on the sound signals of un-interesting sound sources.

Thereby, e.g. competing speakers or other un-interesting sound sources would be suppressed.

The hearing aid may be configured to create one or more directional beams (by the one or more beamformers) based on one or more microphones of the input unit of the hearing aid.

Accordingly, the hearing aid may comprise a directional microphone system adapted to spatially filter sounds from the environment.

The hearing aid may be configured to steer the one or more microphones towards different directions. Thereby, the hearing aid may be configured to determine (and steer) the directional beams towards the directions, from which the sound signals (voices) being part of the hearing aid user's conversation is located.

For example, several beamformers may run in parallel.

One or more of the beamformers may have one of its null directions towards the hearing aid user's own voice.

Based on the directional microphone system a target acoustic source among a multitude of acoustic sources in the local environment of the user wearing the hearing aid may be enhanced. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally, the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise a spatial filterbank.

The spatial filterbank may be configured to use the one or more sound signals to generate spatial sound signals dividing a total space of the environment sound in subspaces, defining a configuration of subspaces. Each spatial sound signal may represent sound coming from a respective subspace.

For example, the environment sound input unit can for example comprise two microphones on a hearing aid, a combination of one microphone on each of a hearing aid in a binaural hearing system, a microphone array and/or any other sound input that is configured to receive sound from the environment and which is configured to generate sound signals including spatial information of the sound. The spatial information may be derived from the sound signals by methods known in the art, e.g., determining cross correlation functions of the sound signals. Space here means the complete environment, i.e., surrounding of a hearing aid user. A subspace is a part of the space and can for example be a volume, e.g. an angular slice of space surrounding the hearing aid user. Likewise, the subspaces need not add up to fill the total space, but may be focused on continuous or discrete volumes of the total space around a hearing aid user.

The spatial filterbank may comprise at least one of the one or more beamformers.

The spatial filterbank may comprise several beamformers, which can be operated in parallel to each other.

Each beamformer may be configured to process the sound signals by generating a spatial sound signal, i.e., a beam, which represents sound coming from a respective subspace. A beam in this text is the combination of sound signals generated from, e.g., two or more microphones. A beam can be understood as the sound signal produced by a combination of two or more microphones into a single directional microphone. The combination of the microphones generates a directional response called a beampattern. A respective beampattern of a beamformer corresponds to a respective subspace. The subspaces are preferably cylinder sectors and can also be spheres, cylinders, pyramids, dodecahedra or other geometrical structures that allow to divide a space into subspaces. The subspaces may additionally or alternatively be near-field subspaces, i.e. beamformers directed towards a near-field sound source. The subspaces preferably add up to the total space, meaning that the subspaces fill the total space completely and do not overlap, i.e., the beampatterns "add up to 1" such as it is preferably done in standard spectral perfect-reconstruction filterbanks. The addition of the respective subspaces to a summed subspace can also exceed the total space or occupy a smaller space than the total space, meaning that there can be empty spaces between subspaces and/or overlap of subspaces. The subspaces can be spaced differently. Preferably, the subspaces are equally spaced.

The noise reduction system may comprise a speech ranking algorithm, for example the minimum overlap gap (MOG) estimator.

The speech ranking algorithm may be configured to provide information to the one or more beamformers. For example, the MOG estimator may be configured to inform the one or more beamformers that e.g. a one point source is a noise signal source and/or another point source is a speech sound source of interest to the hearing aid user (i.e. a target).

The one or more beamformers may be configured to provide information to the MOG estimator.

For example, the one or more beamformers may be configured to inform the MOG estimator that e.g. no point sources are located behind the hearing aid user. Thereby, the MOG estimator may be speeded up as it may disregard point sources from behind.

The VAD of the hearing aid may be configured to determine whether a sound signal (voice) is present in a respective spatial sound signal. The detection whether a sound signal is present in a sound signal by the VAD may be performed by a method known in the art, e.g., by using a means to detect whether harmonic structure and synchronous energy is present in the sound signal and/or spatial sound signal.

The VAD may be configured to continuously detect whether a voice signal is present in a sound signal and/or spatial sound signal.

The hearing aid may comprise a sound parameter determination unit which is configured to determine a sound level and/or signal-to-noise (SNR) ratio of a sound signal and/or spatial sound signal, and/or whether a sound level and/or signal-to-noise ratio of a sound signal and/or spatial sound signal is above a predetermined threshold.

The VAD may be configured only to be activated to detect whether a voice signal is present in a sound signal and/or spatial sound signal when the sound level and/or signal-to-noise ratio of a sound signal and/or spatial sound signal is above a predetermined threshold.

The VAD and/or the sound parameter determination unit may be a unit in the electric circuitry of the hearing aid or an algorithm performed in the electric circuitry of the hearing aid.

VAD algorithms in common systems are typically performed directly on a sound signal, which is most likely noisy. The processing of the sound signals in a spatial filterbank result in spatial sound signals which represent sound coming from a certain subspace. Performing independent VAD algorithms on each of the spatial sound signals allows easier detection of a voice signal in a subspace, as potential noise signals from other subspaces have been rejected by the spatial filterbank.

Each of the beamformers of the spatial filterbank improves the target signal-to-noise signal ratio. The parallel processing with several VAD algorithms allows the detection of several voice signals, i.e., talkers, if they are located in different subspaces, meaning that the voice signal is in a different spatial sound signal.

The spatial sound signals may then be provided to a sound parameter determination unit. The sound parameter determination unit may be configured to determine a sound level and/or signal-to-noise ratio of a spatial sound signal, and/or whether a sound level and/or signal-to-noise ratio of a spatial sound signal is above a predetermined threshold.

The sound parameter determination unit may be configured to only determine sound level and/or signal-to-noise ratio for spatial sound signals which comprise a voice signal.

The noise reduction system may be configured to additionally detect said noise signal during time segments wherein said VAD and OVD both indicate an absence of a speech signal in the at least one electric input signal, or a signal derived therefrom.

The noise reduction system may be configured to additionally detect said noise signal during time segments wherein said VAD indicates a presence of speech with a probability below a speech presence probability (SPP) threshold value.

As mentioned above, the talker extraction unit may be configured to separate the one or more speech signals based on several beamformers of the hearing aid pointing towards different directions away from the hearing aid user. Thereby, the several beamformers may cover a space around the hearing aid user, such as dividing said space into N acoustic pie pieces (subspaces).

When one or more of the N acoustic pie pieces provides no target speech signal, the noise reduction system may be configured to additionally estimate noise signal in the respective one or more acoustic pie pieces. For example, in case only one of the N acoustic pie pieces provides a speech signal of interest to the hearing aid user (i.e. a target speech signal), the noise reduction system may be configured to detect noise signals in the N−1 other acoustic pie pieces. When the conversational partner is found in one of the acoustic pie pieces, the time gaps can be used in a noise reduction system to estimate noise signal in said gap.

When the OVD estimates that the own voice of the hearing aid user is inactive, the one or more beamformers of the hearing aid may be configured to estimate the direction to one or more the sound sources providing speech signals.

The one or more beamformers of the hearing aid may be configured to use the estimated direction to update the one or more beamformers of the hearing aid to not attenuate said one or more speech signals.

When the OVD estimates that the own voice of the hearing aid user is inactive, the one or more beamformers of the hearing aid may be configured to estimate the location of one or more the sound sources providing speech signals.

The one or more beamformers of the hearing aid may be configured to use the estimated location to update the one or more beamformers of the hearing aid to not attenuate said one or more speech signals.

Thereby, the speech signals, which may be of interest to the hearing aid user, may be located and possibly improved.

The hearing aid may further comprise a movement sensor.

A movement sensor may be e.g. be an acceleration sensor, a gyroscope, etc.

The movement sensor may be configured to detect movement of the hearing aid user's facial muscles and/or bones, e.g. due to speech or chewing (e.g. jaw movement), or movement/turning of the hearing aid user's face/head in e.g. vertical and/or horizontal direction, and to provide a detector signal indicative thereof.

The movement sensor may be configured to detect jaw movements. The hearing aid may be configured to apply the jaw movements as an additional cue for own voice detection.

The noise reduction system may be configured to group one or more estimated speech signals in a group categorized with a high degree of interest to the hearing aid user, when movement is detected by the movement sensor.

For example, movements may be detected when the hearing aid user is nodding, e.g. as an indication that the hearing aid user is following and is interested in the sound signal/talk of a conversation partner/speaking partner.

The movement sensor may be configured to detect movements of the hearing aid user following a speech onset (e.g. as determined by the VD, VAD, and/or OVD). For example, movements, e.g. of the head, following a speech onset may be an attention cue indicating a sound source of interest.

When the hearing aid user turns the head, the output from e.g. algorithms providing an estimate of the speech signal of talkers in the user's environment (e.g. by blind source separation techniques, by using several beamformers, etc.) may become less reliable, as thereby the sound sources have moved relative to the user's head.

In response to the movement sensor detecting movements of the user's head (e.g. a turning of the head), the hearing aid (e.g. the talker extraction unit of the hearing aid) may be configured to reinitialize the algorithms.

In response to the movement sensor detecting movements of the user's head (e.g. a turning of the head), the hearing aid (e.g. the talker extraction unit of the hearing aid) may be configured to change, such as reduce, time constants of the algorithms.

In response to the movement sensor detecting movements of the user's head (e.g. a turning of the head), an already existing separation of one or more speech signals may be reset. Thereby, the talker extraction unit has to (once again) provide separate speech signals, each comprising, or indicating the presence of, one of said one or more speech signals.

In response to the movement sensor detecting movements of the user's head (e.g. a turning of the head), the hearing aid (e.g. the talker extraction unit of the hearing aid) may be configured to set the signal processing parameters of the hearing aid to an omni-directional setting. For example, the omni-directional setting may be maintained until a more reliable estimate of separated speech sound sources can be provided.

The hearing aid (e.g. the talker extraction unit of the hearing aid) may be configured to estimate the degree of movement of the user's head as detected by the movement sensor (e.g. a gyroscope). The talker extraction unit may be configured to compensate for the estimated degree of movement of the user's head in the estimation of said separated speech signals. For example, in case the movement sensor detects that the user's head has turned 10 degrees to the left, the talker extraction unit may be configured to e.g. move one or more beamformers (e.g. used to separate the one or more speech signals) 10 degrees to the right.

The hearing aid may comprise a keyword detector.

The hearing aid may comprise a speech detector.

The keyword detector or speech detector may be configured to detect keywords indicating interest to the hearing aid user. For example, keywords such as "um-hum", "yes" or similar may be used to indicate that a voice/speech of another person (conversation partner/speaking partner) is of interest to the hearing aid user.

The noise reduction system may be configured to group speech from another person in a conversation group categorized with a high degree of interest to the hearing aid user, when a keyword is detected simultaneously with the other person is speaking.

The hearing aid may further comprise a language detector.

The language detector may be configured to detect the language of the sound signal (voice) of one or more other talkers. Sound signals in the same language as the language of the hearing aid user may be preferred (i.e. categorized with a higher degree of interest) over sound signals in other languages. Languages which the hearing aid user do not understand may be regarded as part of the background noise (e.g. categorized with a low degree of interest to the hearing aid user).

The hearing aid may further comprise one or more of different types of physiological sensors measuring one or more physiological signals, such as electrocardiogram (ECG), photoplethysmogram (PPG), electroencephalography (EEG), electrooculography (EOG), etc., of the user.

Electrode(s) of the one or more different types of physiological sensors may be arranged at an outer surface of the hearing aid. For example, the electrode(s) may be arranged at an outer surface of a behind-the-ear (BTE) part and/or of an in-the-ear (ITE) part of the hearing aid. Thereby, the electrodes come into contact with the skin of the user (either behind the ear or in the ear canal), when the user puts on the hearing aid.

The hearing aid may comprise a plurality (e.g. two or more) of detectors and/or sensor which may be operated in parallel. For example, two or more of the physiological sensors may be operated simultaneously to increase the reliability of the measured physiological signals.

The hearing aid may be configured to present the separated one or more speech signals as a combined speech signal to the hearing aid user, via the output unit.

The separated one or more speech signals may be weighed according to their ranking.

The separated one or more speech signals may be weighed according to their grouping into conversation groups.

The separated one or more speech signals may be weighted according to their location relative to the hearing aid user. For example, speech signals from preferred locations (e.g. often of interest to the user), such as from a direction right in front of the user, may be weighted higher than speech signals from a direction behind the user. For example, in a case where the one or more speech signals are separated based on several beamformers of the hearing aid pointing towards different directions away from the hearing aid user, and thereby dividing said space around the user into acoustic pie pieces (i.e. subspaces), the acoustic pie pieces may be weighed dissimilarly. Thus, acoustic pie pieces located in front of the user may be weighted higher than acoustic pie pieces located behind the user.

The separated one or more speech signals may be weighted according to their prior weighting.

Thus, acoustic pie pieces e.g. previously being of high interest to the user may be weighted higher than acoustic pie pieces not previously being of interest to the user. Prior weighting of an ongoing conversation may be stored in the memory. For example, when the user moves (e.g. turns) the head, the degree of movement may be determined (e.g. by a gyroscope) and possible prior weighting at the 'new' orientation of the head may be taken into account or even used as a weighting starting point before further separation of speech signals is carried out.

The separated one or more speech signals (e.g. by acoustic pie pieces) may be weighted with a minimum value, so that no speech signal (or acoustic pie piece) is weighted with the value zero.

One or more of the separated one or more speech signals (e.g. by acoustic pie pieces) may be weighted (e.g. preset) with the value zero in a case where it is known that these speech signal (or acoustic pie piece) should/would be zero.

The hearing aid may be configured to construct a combined speech signal suited for presentation to the hearing aid user, where the combined speech signal may be based on the weighing of the one or more speech signals.

A linear combination of each of the one or more separated speech signals (e.g. the acoustic pie pieces) multiplied with each their weighting may be provided.

Thereby, speech signals ranked and/or grouped in a conversation group with a high degree of interest to the hearing aid user may be weighed more in the presented combined speech signal, than speech signals with a lower ranking and/or grouped in a conversation group of lower interest. Alternatively, or additionally, only the speech signal(s) of highest ranking/conversation group is/are presented.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a hearing aid user. The hearing aid may comprise a signal processor for enhancing the input signals and providing a processed output signal.

The hearing aid may comprise antenna and transceiver circuitry allowing a wireless link to an entertainment device (e.g. a TV-set), a communication device (e.g. a telephone), a wireless microphone, or another hearing aid (a contralateral hearing aid), etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50

MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, method of operating a hearing aid adapted for being located at or in an ear of a user, or for being fully or partially implanted in the head of a user is furthermore provided by the present application.

The method may comprise providing at least one electric input signal representing sound in an environment of the hearing aid user, by an input unit.

Said electric input signal may comprise no speech signal, or one or more speech signals from one or more speech sound sources and additional signal components, termed noise signal, from one or more other sound sources.

The method may comprise repeatedly estimating whether or not, or with what probability, said at least one electric input signal, or a signal derived therefrom, comprises a speech signal originating from the voice of the hearing aid user, and providing an own voice control signal indicative thereof, by an own voice detector (OVD).

The method may comprise repeatedly estimating whether or not, or with what probability, said at least one electric input signal, or a signal derived therefrom, comprises the no speech signal, or the one or more speech signals from speech sound sources other than the hearing aid user, and providing a voice activity control signal indicative thereof, by a voice activity detector (VAD).

The method may comprise determining and/or receiving the one or more speech signals as separated one or more speech signals from speech sound sources other than the hearing aid user and detecting the speech signal originating from the voice of the hearing aid user, by a talker extraction unit.

The method may comprise providing separate signals, each comprising, or indicating the presence of, one of said one or more speech signals, by the talker extraction unit.

The method may comprise determining a speech overlap and/or gap between said speech signal originating from the voice of the hearing aid user and each of said separated one or more speech signals, by a noise reduction system.

It is intended that some or all of the structural features of the hearing aid described above, in the 'detailed description of embodiments' or in the claims can be combined with embodiments of the method, when appropriately substituted by a corresponding process and vice versa. Embodiments of the method have the same advantages as the corresponding hearing aid.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

In a further aspect, a hearing system comprising a hearing aid and an auxiliary device, where the auxiliary device comprises a VAD, is moreover provided.

The hearing system may be configured to forward information from the hearing aid to the auxiliary device.

For example, audio (or electric input signal representing said audio) from one or more speech sound sources and/or one or more other sound sources (e.g. noise) may be forwarded from the hearing aid to the auxiliary device.

The auxiliary device may be configured to process the received information from the hearing aid. The auxiliary device may be configured to forward the processed information to the hearing aid. The auxiliary device may be configured to estimate speech signals in the received information by the VAD.

For example, the auxiliary device may be configured to determine the direction to the speech sound sources and/or other sound sources and forward the information to the hearing aid.

For example, the auxiliary device may be configured to separate the one or more speech signals (e.g. by use of TasNET, DNN, etc., see above) and forward the information to the hearing aid. The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be a clip-on microphone carried by another person.

The auxiliary device may comprise a voice activity detection unit (e.g. a VD, VAD, and/or OVD) for picking up the own voice of the hearing aid user. The voice activity may be transmitted to the hearing aid(s).

The auxiliary device may be shared among different hearing aid users.

The auxiliary device may be constituted by or comprise another hearing aid. The hearing system may comprise two hearing aids adapted to implement a binaural hearing system, e.g. a binaural hearing aid system.

In an aspect, a binaural hearing system comprising a hearing aid and a contralateral hearing aid is furthermore provided in the present application.

The binaural hearing system may be configured to allow an exchange of data between the hearing aid and the contralateral hearing aid, e.g. via an intermediate auxiliary device.

An APP:

In a further aspect, a non-transitory application, termed an APP, is furthermore provided by the present application. The APP comprises executable instructions configured to be executed on an auxiliary device to implement a user interface for a hearing aid or a hearing system described above in the 'detailed description of embodiments', and in the claims. The APP may be configured to run on a cellular phone, e.g. a smartphone, or on another portable device allowing communication with said hearing aid or said hearing system.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically, or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

Figure 1A:
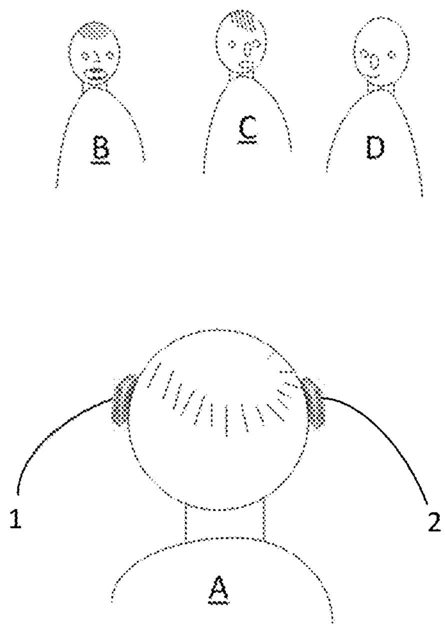
FIG. 1A. shows a hearing aid user A and three talkers B, C, and D.

FIG. 1A shows a hearing aid user A and three talkers B, C, and D.

In FIG. 1A, the hearing aid user A is illustrated to wear one hearing aid 1 at the left ear and another hearing aid 2 at the right ear. The hearing aid user A is able to receive speech signal from each of the talkers B, C, and D by use of the one 1 and other hearing aid 2.

Alternatively, each of the talkers B, C, and D may be equipped with a microphone (e.g. in form of a hearing aid) capable of transmitting audio or information about when each of the talkers B, C, and D voices are active. The voices may be detected by a VD and/or a VAD.

Figure 1B:
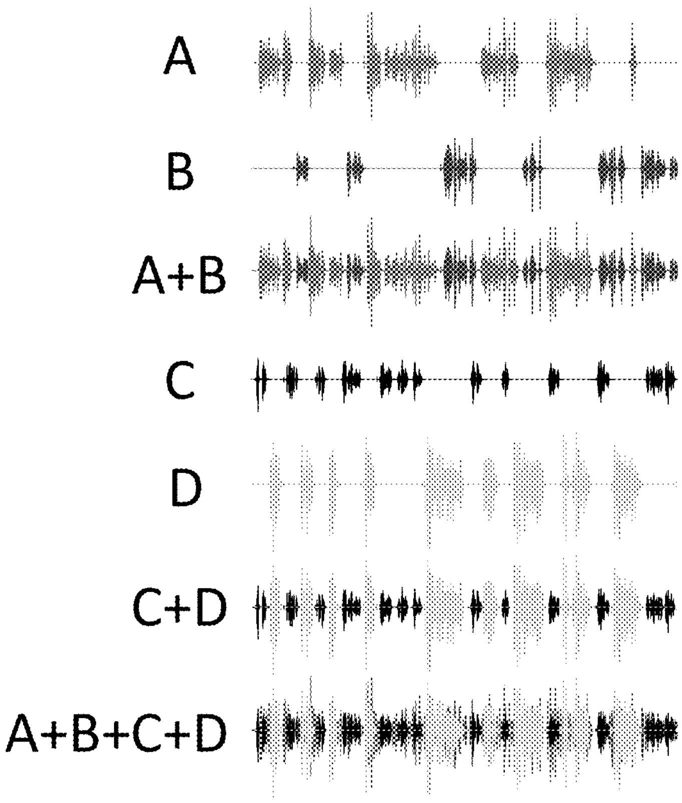
FIG. 1B shows an example of speech signals from the hearing aid user A and from the three talkers B, C, and D.

FIG. 1B shows an example of speech signals from the hearing aid user A and from the three talkers B, C, and D.

In FIG. 1B, the situation of creating one or more conversation groups is illustrated. The conversation groups may be defined by comparing the speech overlaps between each of the one or more speech signals and all of the other one or more speech signals, including the speech signal from the hearing aid user A. In other words, the speech signal of hearing aid user A may be compared with each of the speech signals of talkers B, C, and D to determine speech overlaps. The speech signal of talker B may be compared with each of the speech signals of talkers C, D, and of the hearing aid user A to determine speech overlaps. Similar comparisons may be carried out for talkers C and D.

As seen from the speech signals of the hearing aid user A, of the talker B, and of the combined signal A+B, the speech signal of the hearing aid user A does not overlap in time with the speech signal of talker B.

Similarly, as seen from the speech signals of the talkers C and D, and of the combined signal C+D, the speech signal of the talker C does not overlap in time with the speech signal of the talker D.

At the bottom of FIG. 1B, the combined speech signals of the hearing aid user A and of the three talkers B, C, and D are shown.

Accordingly, as the hearing aid user A and talker B do not talk at the same time, it indicates that a conversation is going on between the hearing aid user A and talker B. Similarly, as the talkers C and D do not talk at the same time, it indicates that a conversation is going on between the talkers C and D.

As seen in the combined speech signal (A+B+C+D), the speech signals of talker C and talker D overlap in time with talker A and talker B. Therefore, it may be concluded that talkers C and D have a simultaneous conversation, independent of the hearing aid user A and the talker B. Thus, the conversation between talker C and talker D is of less interest to the hearing aid user, and may be regarded as part of the background noise signal.

Thereby, the talkers belonging to the same group of talkers do not overlap in time while talkers belonging to different dialogues (e.g. hearing aid user A and talker C) do overlap in time. It may be assumed that talker B is of main interest to the hearing aid user, while talkers C and D are of less interest as talker C and D overlap in time with the hearing aid user A and talker B. The hearing aid(s) may therefore group the speech signal of talker B into a conversation group categorized with a higher degree of interest than the conversation group comprising the speech signals of talkers C and D, based on the overlaps/no-overlaps of the speech signals.

Figure 2:
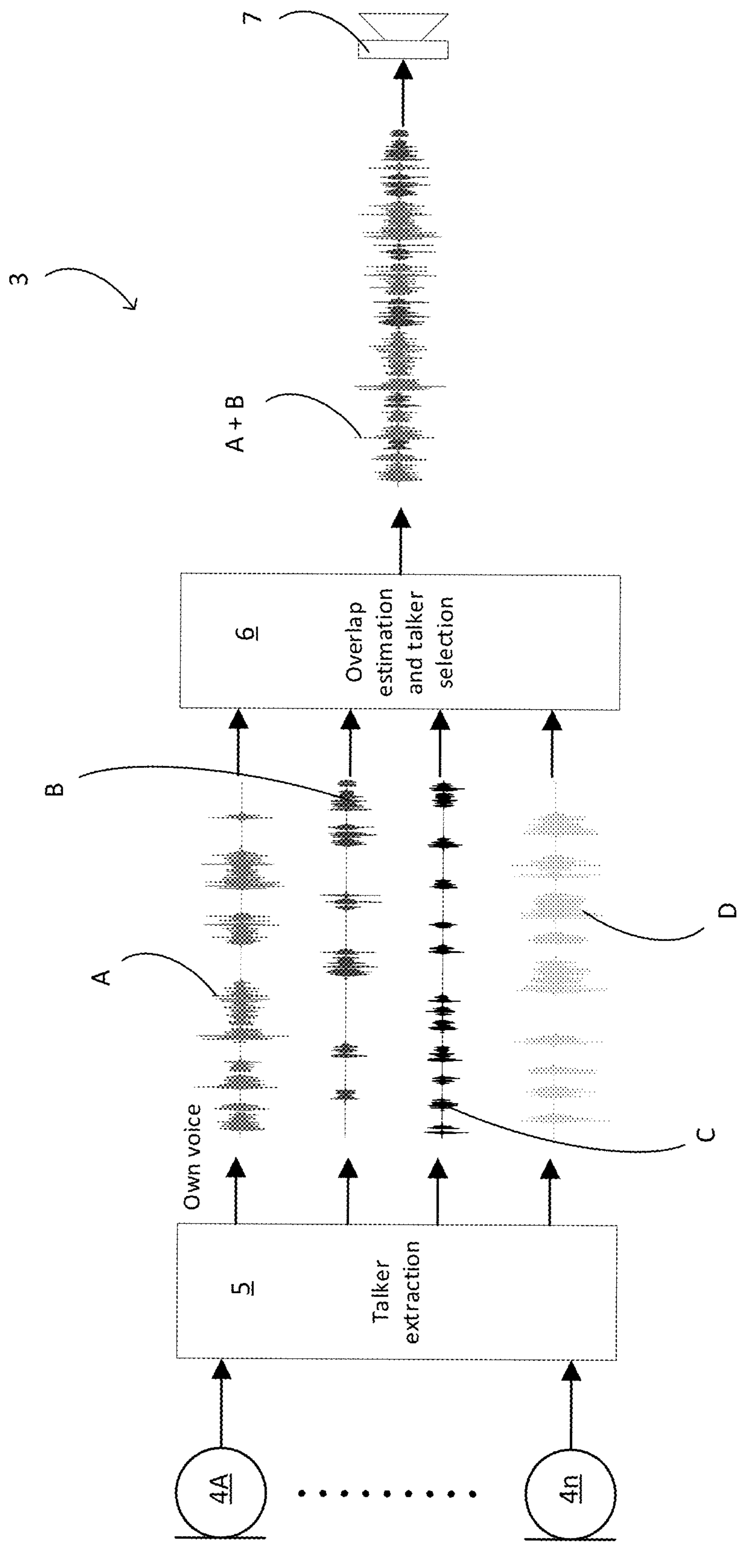
FIG. 2 shows an example of a hearing aid for selecting the talkers of interest among several talkers.

FIG. 2 shows an example of a hearing aid for selecting the talkers of interest among several talkers.

In FIG. 2, the hearing aid 3 is shown to comprise an input unit for providing at least one electric input signal representing sound in an environment of the hearing aid user, said electric input signal comprising one or more speech signals from one or more speech sound sources and additional signal components, termed noise signal, from one or more other sound sources. The input unit may comprise a plurality (n) of input transducers 4A;**4*n***, e.g. microphones.

The hearing aid may further comprise an OVD (not shown) and a VAD (not shown).

The hearing aid 3 may further comprise a talker extraction unit 5 for receiving the electric input signals from the plurality of input transducers 4A;**4*n*. The talker extraction unit 5** may be configured to separate the one or more speech signals, estimated by the VAD, and to detect the speech signal originating from the voice of the hearing aid user, by the OVD.

The talker extraction unit 5 may be further configured to provide separate signals, each comprising, or indicating the presence of, one of said one or more speech signals.

In the example of FIG. 2, the talker extraction unit 5 is shown to separate speech signals received by the plurality of input transducers 4A;**4*n*** into separate signals, in the form of a signal from the hearing aid user A (own voice) and from the talkers B, C, and D.

The hearing aid 3, such as a speech ranking and noise reduction system 6 of the hearing aid 3, may further be configured to determine/estimate a speech overlap between said speech signal originating from the voice of the hearing aid user A and each of said separated one or more speech signals by a speech ranking algorithm, which is illustrated to originate from talkers B, C, and D.

Based on the determined speech overlap, the hearing aid 3 may be configured to determine the speech signal(s) of interest to the hearing aid user and to output the interesting speech signal(s) and the own voice via an output unit 7, thereby providing a stimulus perceived by the hearing aid user as an acoustic signal.

FIGS. 3A-3D show a schematic illustration of a hearing aid user listening to sound from four different configurations of a subspace of a sound environment surrounding the hearing aid user.

Figure 3A:
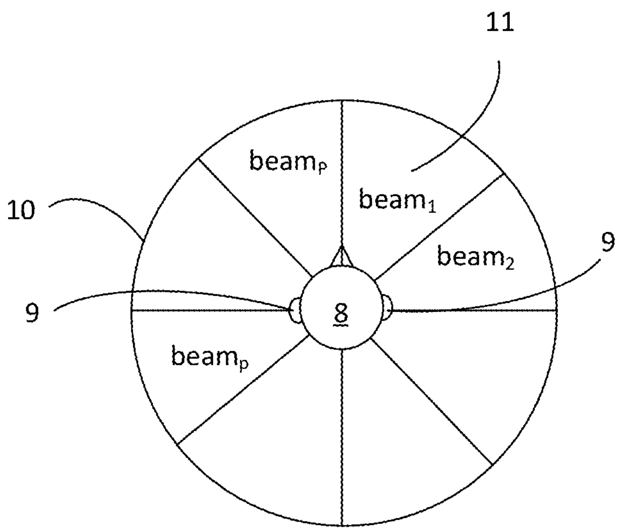
FIG. 3A-3D show a schematic illustration of a hearing aid user listening to sound from four different configurations of a subspace of a sound environment surrounding the hearing aid user.

FIG. 3A shows a hearing aid user 8 wearing a hearing aid 9 at each ear.

The total space 10 surrounding the hearing aid user 8 may be a cylinder volume, but may alternatively have any other form. The total space 10 can also for example be represented by a sphere (or semi-sphere, a dodecahedron, a cube, or similar geometric structures). A subspace 11 of the total space 10 may correspond to a cylinder sector. The subspaces 11 can also be spheres, cylinders, pyramids, dodecahedra or other geometrical structures that allow to divide the total space 10 into subspaces 11. The subspaces 11 add up to the total space 10, meaning that the subspaces 11 fill the total space 10 completely and do not overlap. Each $beam_p$, p=1, 2, . . . , P, may constitute a subspace (cross-section) where P (here equal to 8) is the number of subspaces 11. There may also be empty spaces between the subspaces 11 and/or overlap of subspaces 11. The subspaces 11 in FIG. 3A are equally spaced, e.g., in 8 cylinder sections with 45 degrees. The subspaces 11 may also be differently spaced, e.g., one section with 100 degrees, a second section with 50 degrees and a third section with 75 degrees.

A spatial filterbank may be configured to divide the one or more sound signals into subspaces corresponding to directions of a horizontal "pie", which may be divided into, e.g., 18 slices of 20 degrees with a total space 10 of 360 degrees.

The location coordinates, extension, and number of subspaces 11 depends on subspace parameters. The subspace parameters may be adaptively adjusted, e.g., in dependence of an outcome of the VAD, etc. The adjustment of the extension of the subspaces 11 allows to adjust the form or size of the subspaces 11. The adjustment of the number of subspaces 11 allows to adjust the sensitivity, respective resolution and therefore also the computational demands of the hearing aids 9 (or hearing system). Adjusting the location coordinates of the subspaces 11 allows to increase the sensitivity at certain location coordinates or directions in exchange for a decreased sensitivity for other location coordinates or directions.

Figure 3B:
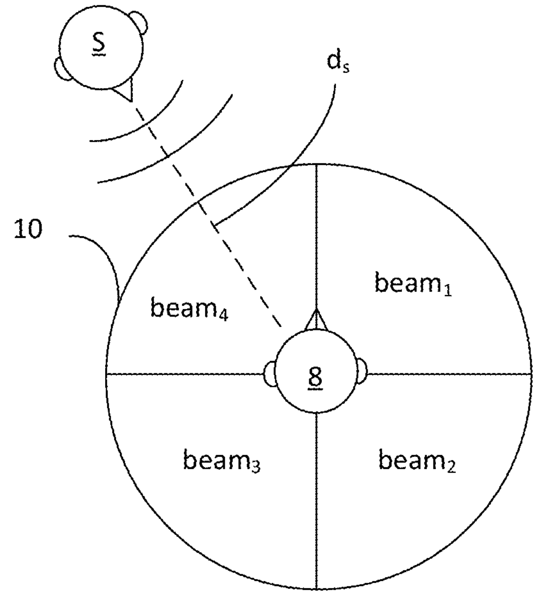
Figure 3C:
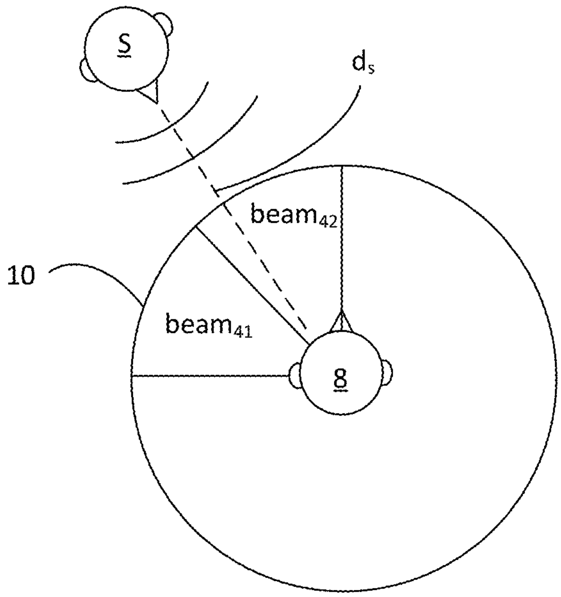

FIG. 3B and 3C illustrate application scenarios comprising different configurations of subspaces. In FIG. 3B, the total space 10 around the hearing aid user 8 is divided into 4 subspaces, denoted beam1, beam2, beam3, and beam4. Each subspace beam comprises one fourth of the total angular space, i.e. each spanning 90° (in the plane shown), and each being of equal form and size. The subspaces need not be of equal form and size, but may in principle be of any form and size (and location relative to the hearing aid user 8). Likewise, the subspaces need not add up to fill the total space 10, but may be focused on continuous or discrete volumes of the total space 10.

In FIG. 3C, the subspace configuration comprises only a part of the total space 10 around the hearing aid user 8, i.e. a fourth divided into two subspaces denoted beam41 and beam42.

FIGS. 3B and 3C may illustrate a scenario where the acoustic field in a space around a hearing aid user 8 is analysed in at least two steps using different configurations of the subspaces of the spatial filterbank, e.g. first and second configurations, and where the second configuration is derived from an analysis of the sound field in the first configuration of subspaces, e.g. according to a predefined criterion, e.g. regarding characteristics of the spatial sound signals of the configuration of subspaces. A sound source S is shown located in a direction represented by vector $d_s$ relative to the user 8. The spatial sound signals of the subspaces of a given configuration of subspaces may e.g. be analysed to evaluate characteristics of each corresponding spatial sound signal (here no prior knowledge of the location and nature of the sound source S is assumed). Based on the analysis, a subsequent configuration of subspaces is determined (e.g. beam41, beam42 in FIG. 3C), and the spatial sound signals of the subspaces of the subsequent configuration are again analysed to evaluate characteristics of each (subsequent) spatial sound signal. Characteristics of the spatial sound signals may comprise a measure comprising signal and noise (e.g. SNR), and/or a voice activity detection, and/or other. The SNR of subspace beam4 is the largest of the four SNR-values of FIG. 3B, because the sound source is located in that subspace (or in a direction from the hearing aid user within that subspace). Based thereon, the subspace of the first configuration (of FIG. 3B) that fulfils the predefined criterion (subspace for which SNR is largest) is selected and further subdivided into a second configuration of subspaces aiming at possibly finding a subspace, for which the corresponding spatial sound signal has an even larger SNR (e.g. found by applying the same criterion that was applied to the first configuration of subspaces). Thereby, the subspace defined by beam42 in FIG. 3C may be identified as the subspace having the largest SNR. An approximate direction to the source S is automatically defined (within the spatial angle defined by subspace beam42). If necessary, a third subspace configuration based on beam42 (or alternatively or additionally a finer subdivision of the subspaces (e.g. more than two subspaces)) may be defined and the criterion for selection applied.

Figure 3D:
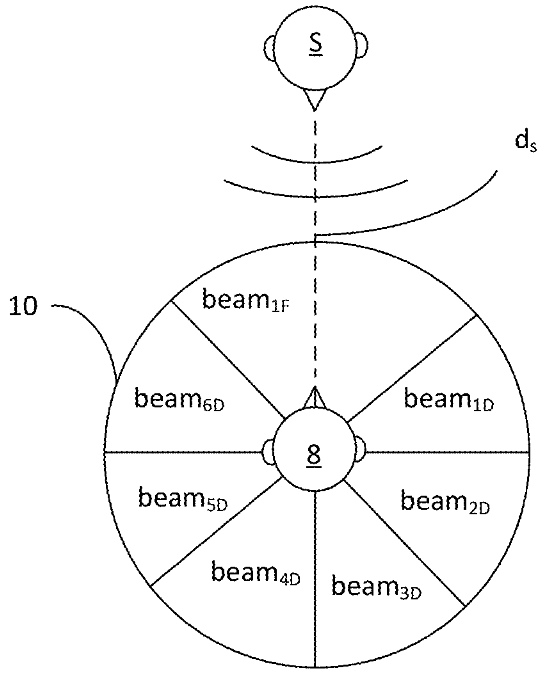

FIG. 3D illustrates a situation where the configuration of subspaces comprises fixed as well as adaptively determined subspaces. In the example shown in FIG. 3D a fixed subspace ($beam_{1F}$) is located in a direction $d_s$ towards a known target sound source S (e.g. a person or a loudspeaker) in front of the hearing aid user 8, and wherein the rest of the subspaces ($beam_{1D}$ to $beam_{6D}$) are adaptively determined, e.g. determined according to the current acoustic environment. Other configurations of subspaces comprising a mixture of fixed and dynamically (e.g. adaptively) determined subspaces are possible.

Figure 4:
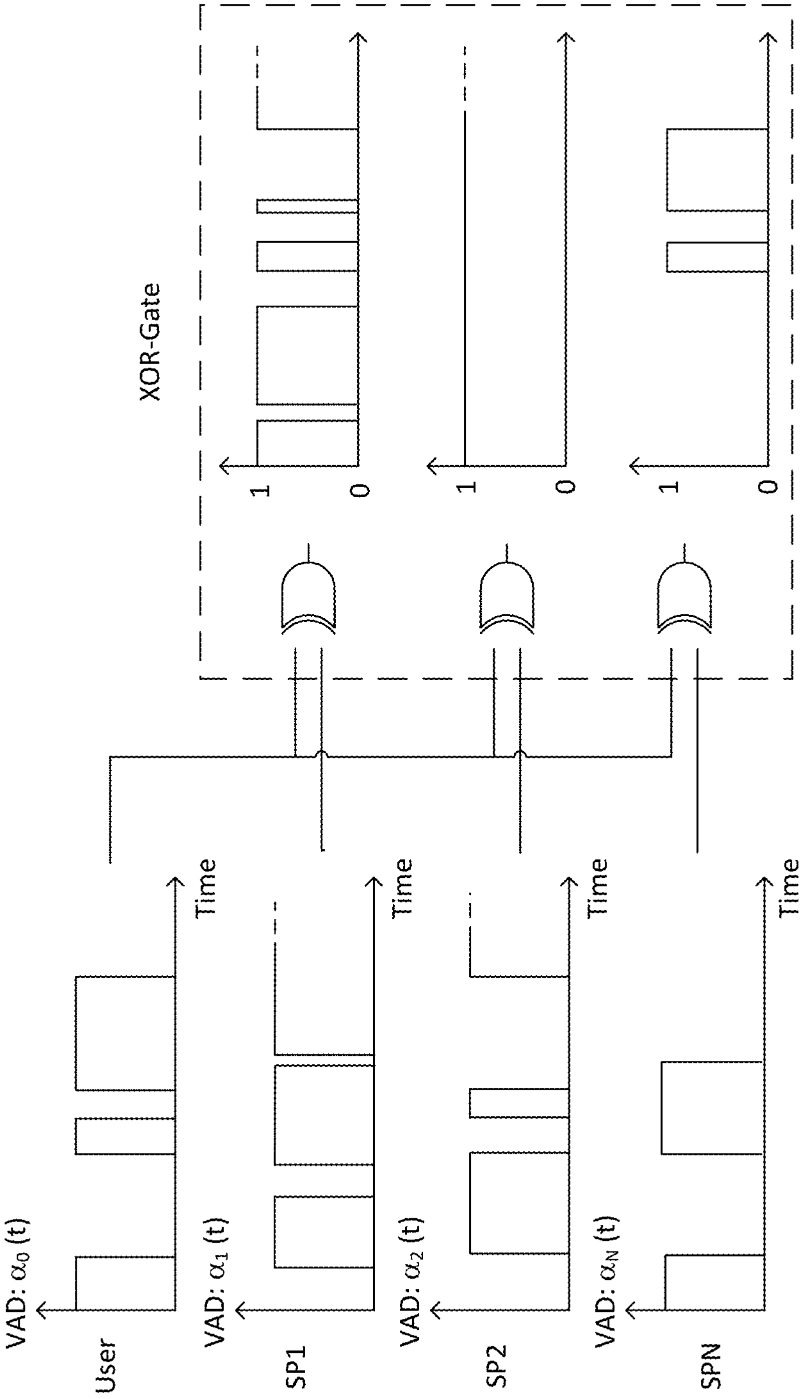
FIG. 4 shows an exemplary determination of overlap/gap between a hearing aid user and a plurality of talkers.

FIG. 4 shows an exemplary determination of overlap/gap between a hearing aid user and a plurality of talkers.

In FIG. 4, a determination of voice activity (voice activity control signal) by a VAD ($\alpha_x$, x=0 . . . N) as a function of time is shown for a hearing aid user ('User') and a plurality of possible speaking partners ('SP1', 'SP2', . . . 'SPN'). A VAD larger than 0 indicates that voice activity is present, and a VAD equal to 0 indicates that no voice activity is detected. The separate VADs may be determined by the talker extraction unit.

As shown, the voice activity of each of the speaking partners ('SP1', 'SP2', . . . 'SPN') may be compared with the voice activity of the hearing aid user ('User').

The comparisons of the voice activity (thereby determining speech overlap) may be carried out in one or more of several different ways. In FIG. 4, the determining of speech overlap is illustrated to be based on an XOR-gate estimator. Another, or additional, way of comparing the voice activity (thereby determining speech overlap) may be based on a maximum mean-square-error (MSE) estimator, and yet another, or additional, way may be based on a NAND(NOT-AND)-gate estimator.

The XOR-gate estimator may compare the own voice (own voice control signal) with each of the separate speaking partner signals (speaking partner control signals) to thereby provide an overlap control signal for each of said separate signals. The resulting overlap control signals for the speech signals ('User', 'SP1', 'SP2', . . . 'SPN') identify time segments where speaking partner speech signals has no overlap with the voice of the hearing aid user by providing a '1'.

Time segments with speech overlap provides a '0'.

Thereby, the speech signal of the speaking partners ('SP1', 'SP2', . . . 'SPN') in the sound environment of the hearing aid user ('User') at a given time may be ranked according to a minimum speech overlap with the own voice speech signal of the hearing aid user (and/or the speaking partner with the smallest speech overlap may be identified).

Thereby, an indication of a probability of a conversation being conducted between the hearing aid user ('User') and one or more of the speaking partners ('SP1', 'SP2', . . . 'SPN') around the hearing aid user ('User') may be provided. Further, by comparing each of the separate signals with all the other separate signals and ranking the separate signals according to the smallest overlap with the own voice speech signal, the separate signals may be grouped into different conversation groups of varying interest to the hearing aid user.

The output of the comparison may be low-pass filtered (by a low-pass filter of the hearing aid). For example, a low-pass filter may have a time constant of 1 second, 10 seconds, 20 seconds, or 100 seconds.

Additionally, a NAND-gate estimator may compare the own voice (own voice control signal) with each of the separate speaking partner signals (speaking partner control signals). The NAND-gate estimator may be configured to indicate that speech overlaps are the main cue for disqualifying speaking partners.

For example, in FIG. 4, there may be long pauses in the conversation between the hearing aid user ('User') and one or more of the speaking partners ('SP1', 'SP2', . . . 'SPN'), e.g. where they are considering their next contribution to the conversation. For this reason, it may be assumed that speech overlaps disqualify more than gaps.

In FIG. 4, it is seen that SP2 has the least overlap, while SPN has most overlap. Therefore, SP2 is most likely the most interesting speaking partner to the hearing aid user, while SP1 is of less interest, and SPN most likely is taking part of another conversation than with the hearing aid user.

The duration of the conversations between the hearing aid user ('User') and each (more) of the speaking partners ('SP1', 'SP2', . . . 'SPN') may be logged in the hearing aid (e.g. in a memory of the hearing aid).

The duration of said conversations may be measured by a timer/counter, e.g. to count the amount of time where OV is detected and the amount of time where the voice(s) (of interest) of one or more of the speaking partners ('SP1', 'SP2', . . . 'SPN') are detected.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. Hearing aid adapted for being located at or in an ear of a hearing aid user, or for being fully or partially implanted in the head of a hearing aid user, the hearing aid comprising:

an input unit for providing at least one electric input signal representing sound in an environment of the hearing aid user, said electric input signal comprising no speech signal, or one or more speech signals from one or more speech sound sources and additional signal components, termed noise signal, from one or more other sound sources, an own voice detector (OVD) for repeatedly estimating whether or not, or with what probability, said at least one electric input signal, or a signal derived therefrom, comprises a speech signal originating from the voice of the hearing aid user, and providing an own voice control signal indicative thereof, a voice activity detector (VAD) for repeatedly estimating whether or not, or with what probability, said at least one electric input signal, or a signal derived therefrom, comprises the no speech signal, or the one or more speech signals from speech sound sources other than the hearing aid user, and providing a voice activity control signal indicative thereof, a talker extraction unit configured to determine and/or receive the one or more speech signals as separated one or more speech signals from speech sound sources other than the hearing aid user and to detect the speech signal originating from the voice of the hearing aid user, and where the talker extraction unit is further configured to provide separate signals, each comprising, or indicating the presence of, one of said one or more speech signals, and a noise reduction system configured to determine a speech overlap and/or gap between said speech signal originating from the voice of the hearing aid user and each of said separated one or more speech signals; wherein the noise reduction system is further configured to determine said speech overlap and/or gap based on an error estimator for estimating the speech overlap and/or gap between said speech signal originating from the own voice of the hearing aid user and each of said separated one or more speech signals.

2. Hearing aid according to claim 1, wherein the noise reduction system is configured to determine the speech overlap and/or gap based at least on estimating whether or not, or with what probability, said at least one electric input signal, or signal derived therefrom, comprises speech signal originating from the voice of the hearing aid user and/or speech signals from each of said separated one or more speech signals.

3. Hearing aid according to claim 2, wherein the noise reduction system is further configured to determine said speech overlap and/or gap based on an XOR-gate estimator for estimating the speech overlap and/or gap between said speech signal originating from the own voice of the hearing aid user and each of said separated one or more speech signals.

4. Hearing aid according to claim 2, wherein the noise reduction system is further configured to determine said speech overlap and/or gap based on a maximum mean-square-error estimator for estimating the speech overlap and/or gap between said speech signal originating from the own voice of the hearing aid user and each of said separated one or more speech signals.

5. Hearing aid according to claim 1, wherein the noise reduction system is further configured to determine said speech overlap and/or gap based on an XOR-gate estimator for estimating the speech overlap and/or gap between said speech signal originating from the own voice of the hearing aid user and each of said separated one or more speech signals.

6. Hearing aid according to claim 5, wherein the noise reduction system is further configured to determine said speech overlap and/or gap based on a maximum mean-square-error estimator for estimating the speech overlap and/or gap between said speech signal originating from the own voice of the hearing aid user and each of said separated one or more speech signals.

7. Hearing aid according to claim 1, wherein the noise reduction system is further configured to determine said speech overlap and/or gap based on a maximum mean-square-error estimator for estimating the speech overlap and/or gap between said speech signal originating from the own voice of the hearing aid user and each of said separated one or more speech signals.

8. Hearing aid according to claim 1, wherein the hearing aid further comprises a timer configured to determine one or more time segments of said speech overlap between the speech signal originating from the own voice of the hearing aid user and each of said separated one or more speech signals.

9. Hearing aid according to claim 8, wherein the hearing aid is configured to rank said separated one or more speech signals depending on the time segments of each of the speech overlaps between the speech signal originating from the own voice of the hearing aid user and each of said separated one or more speech signals, where the speech signals are ranked with an increasing degree of interest as a function of a decreasing time segment of speech overlap.

10. Hearing aid according to claim 8, wherein the hearing aid is configured to determine whether said one or more of the time segments exceeds a time limit, and if so to label the respective speech signal as being part of the noise signal or to rank the respective speech signal with a lower degree of interest to the hearing aid user compared to speech signals that do not exceed said time limit.

11. Hearing aid according to claim 1, wherein the one or more speech signals are grouped into one or more conversation groups depending at least on the amount of speech overlap between the speech signal of the hearing aid user estimated by the OVD and the separated one or more speech signals, and where the one or more conversation groups are categorized with a varying degree of interest to the hearing aid user.

12. Hearing aid according to claim 11, wherein the one or more conversation groups are defined by comparing the speech overlaps between each of the one or more speech signals and all of the other one or more speech signals, including the speech signal from the hearing aid user.

13. Hearing aid according to claim 11, wherein the hearing aid further comprises a movement sensor, and wherein the noise reduction system is configured to group one or more estimated speech signals in a group categorized with a high degree of interest to the hearing aid user, when movement is detected by the movement sensor.

14. Hearing aid according to claim 1, wherein the noise reduction system is configured to group the one or more separated speech signals into said one or more conversation groups depending at least on the determined direction and/or location of said one or more speech signals.

15. Hearing aid according to claim 1, wherein the hearing aid comprises one or more beamformers, and wherein the input unit is configured to provide at least two electric input signals connected to the one or more beamformers, and wherein the one or more beamformers are configured to provide at least one beamformed signal.

16. Hearing aid according to claim 15, wherein the one or more beamformers comprises one or more own voice cancelling beamformers configured to attenuate the speech signal originating from the own voice of the hearing aid user as determined by the OVD.

17. Hearing aid according to claim 15, wherein, when the OVD estimates that the own voice of the hearing aid user is inactive, the one or more beamformers of the hearing aid is configured to estimate the direction to and/or location of one or more the sound sources providing speech signals, and to use the estimated direction and/or location to update the one or more beamformers of the hearing aid to not attenuate said one or more speech signals.

18. Hearing aid according to claim 1, wherein the noise reduction system is configured to additionally detect said noise signal during time segments wherein said VAD and OVD both indicate an absence of a speech signal in the at least one electric input signal, or a signal derived therefrom, or a presence of speech signal with a probability below a speech presence probability (SPP) threshold value.

19. A binaural hearing system comprising a hearing aid and a contralateral hearing aid according to claim 1, the binaural hearing system being configured to allow an exchange of data between the hearing aid and the contralateral hearing aid.

20. A method of operating a hearing aid adapted for being located at or in an ear of a hearing aid user, or for being fully or partially implanted in the head of a hearing aid user, the method comprising:

providing at least one electric input signal representing sound in an environment of the hearing aid user, by an input unit, said electric input signal comprising no speech signal, or one or more speech signals from one or more speech sound sources and additional signal components, termed noise signal, from one or more other sound sources, repeatedly estimating whether or not, or with what probability, said at least one electric input signal, or a signal derived therefrom, comprises a speech signal originating from the voice of the hearing aid user, and providing an own voice control signal indicative thereof, by an own voice detector (OVD), repeatedly estimating whether or not, or with what probability, said at least one electric input signal, or a signal derived therefrom, comprises the no speech signal, or the one or more speech signals from speech sound sources other than the hearing aid user, and providing a voice activity control signal indicative thereof, by a voice activity detector (VAD), determining and/or receiving the one or more speech signals as separated one or more speech signals from speech sound sources other than the hearing aid user and detecting the speech signal originating from the voice of the hearing aid user, by a talker extraction unit, providing separate signals, each comprising, or indicating the presence of, one of said one or more speech signals, by the talker extraction unit, determining a speech overlap and/or gap between said speech signal originating from the voice of the hearing aid user and each of said separated one or more speech signals, by a noise reduction system, wherein the noise reduction system is further configured to determine said speech overlap and/or gap based on an error estimator for estimating the speech overlap and/or gap between said speech signal originating from the own voice of the hearing aid user and each of said separated one or more speech signals.

* * * * *